Patented Sept. 8, 1931

1,822,588

UNITED STATES PATENT OFFICE

MORRIS G. FOWLER, OLIVER C. RALSTON, AND CHARLES R. KUZELL, OF CLARKDALE, ARIZONA, ASSIGNORS TO UNITED VERDE COPPER COMPANY, OF CLARKDALE, ARIZONA, A CORPORATION OF DELAWARE

RECOVERING COPPER FROM SLAGS

No Drawing. Application filed January 14, 1929. Serial No. 332,558.

This invention relates to a process for recovering copper and other heavy metals from copper containing slags, basic or acid, by injecting suitable reducing agents through a liquid bath of slag or a liquid bath of slag in contact with matte in any suitable furnace or vessel. When the process, as we have developed it, is worked as a batch process, we prefer to use a vessel similar in type to a copper converter, horizontal or vertical, equipped with tuyéres for injection of reducing agents; and from which the charge may be poured rapidly after completion of the reduction.

The process as developed was for the purpose of separating zinc and other volatile metals from slags and mattes, but it was discovered that the process was also especially valuable for the recovery from slags of copper and other heavy metals and thus may be applied for that purpose alone or in conjunction with recovery of zinc. The latter purpose is covered in a separate co-pending patent application, (Serial No. 332,556, filed January 14, 1929, by M. G. Fowler and D. Niconoff).

Suitable reducing agents are those that will reduce iron and copper from their oxides and may be injected by means of tuyéres through the molten bath. Solid, liquid or gaseous reducing agents may be used, but the choice depends on the efficiency of the reduction and the cost of the reducing agent. The most suitable solid reducing agent is pulverized coal which may be injected through the bath by means of compressed air or steam, or a mixture of the two. Liquid reducing agents that may be used are the various hydrocarbon oils and they may be injected by themselves under pressure or by means of compressed air or steam or a mixture of the two. In using solid or liquid reducing agents, they are entirely, or nearly so, gasified immediately they are injected into the bath, so the actual reducing agents are in the main gaseous. The reducing gases that may be used are hydrocarbon gases, carbon monoxide and hydrogen, though in practice the pure gases are not used due to their high cost, but producer gas or water gas, the reducing powers of which depend on their content of carbon monoxide, hydrogen and hydrocarbons, are used. These gases, of course, are diluted with nitrogen and carbon dioxide, the amount depending on conditions of production. This also holds true for the gases generated in the bath itself during injection of solid or liquid fuel.

Copper blast furnace and reverberatory slags average .35% to .4% Cu, though they may vary beyond these figures in certain cases. These slags are ordinarily discarded and their content of copper lost.

We have found by experiment that the major portion of this copper may be recovered by blowing suitable reducing agents through the liquid bath of slag or liquid bath of slag and matte in contact, causing the copper to separate from the slag. The exact function of the reducing agents in causing the separation has not been determined, but is apparently two fold. Compounds such, for example, as magnetite, which tend to hold copper in solution or suspension, are reduced with a resulting liberation of copper from the slag, and a surface action which causes coalescence of the small matte globules into bodies of sufficient weight to settle from the slag takes place. The reduction of slag in contact with matte goes more readily than reduction of slag by itself since any metallic iron produced by reduction of iron oxide from the slag dissolves readily in the matte giving a slag of higher silicate degree and of lower specific gravity, which thus will hold less copper matte in solution or suspension. The slag may be reduced by itself easily enough if the reduction is not continued long enough to cause thickening, due to considerable disseminated metallic iron of high melting point. Generally all the copper that can be recovered will be separated before the slag begins to thicken. In cases of slags relatively high in sulphur, above 1.0% S, there is less danger of thickening, since the metallic iron produced during the reduction tends to dissolve in the sulphide contained in the slag and as a result has a lower melting point than pure metallic iron, and thus tends to settle out readily with the copper instead of remaining disseminated in the slag causing thickening. In other words, the conditions necessary to permit separation of the copper from the slag by itself are such that will keep the slag thinly liquid and permit settling.

The reduction of basic slags for recovery of copper goes much the same as acid slags, when the reduction is done in contact with matte. Much more iron can be reduced from basic slags since there is more iron oxide in the slag uncombined with silica. It is possible to continue the reduction until the slag has increased in silica from 22% to 35–40% $SiO_2$ due to the iron being reduced and going into the matte. This is not necessary in most cases, however, since most of the copper is separated before much iron is reduced from the slag.

In reducing basic slags by themselves to separate the copper the danger of thickening is greater than in the case of the acid slags. Those high in sulphur present less difficulty for the same reason as pointed out above.

We have found by experiment that the best reducing agent for separating copper from basic slag is a gas high in carbon monoxide and low in hydrogen, such as is produced by running a gas producer with straight air, or injecting coal or oil with air alone. The high CO gas separates the copper before reducing much iron at temperatures 2200°–2400° F.

We have been able to treat copper furnace acid slags containing .35 to .45% Cu by our process, the resulting slags containing only .13 to .15% Cu. Basic converter slags, which contained 2 to 3% Cu were reduced in copper content to .4 to .45% Cu after treatment.

While the following theory is not essential to our claims we believe it satisfactorily explains the phenomena we have discovered. Most slags, but especially basic converter slags, normally have a considerable content of magnetite, 5 to 25% $Fe_3O_4$, which causes a great deal of trouble in the furnaces where the converter slags are rehandled to recover as much of the copper as possible. The magnetite "mush" tends to fill up the bottoms of the furnaces by accretion and also, through causing poor settling, increases the copper loss in the final slag that is discarded. By reducing the converter slags according to our process the magnetite is reduced to ferrous oxide which is more fusible and easily slagged and therefore the copper may be reduced low enough so the slag can be discarded, or if the copper content is still so high that it will pay to return it to the smelting or settling furnaces, the magnetite content will be so low as to cause no trouble.

We claim:

1. The process for recovering copper or other heavy metals from slag which comprises injecting suitable solid, liquid or gaseous reducing agents through a molten bath of slag and matte in contact, the copper or copper matte held in the slag uniting with the bath of matte.

2. The process for recovering copper from converter slags which comprises injecting solid, liquid or gaseous reducing agents into the bath before the converter slag is poured to reduce it to a more fluid slag from which copper or matte may be settled in a suitable settling furnace or in the converter itself, without the necessity of returning converter slag to a reverberatory or to a blast furnace settler.

3. The improvement in copper metallurgy which comprises subjecting molten slag obtained in the treatment of copper ore to the action of a reducing agent to reduce one or more uncombined iron compounds and effect the precipitation of matte contained therein, and separating the matte and slag.

4. The process for recovering matte from slag which comprises injecting a reducing agent into a molten slag bath to reduce one or more compounds contained therein and precipitate the matte, and separating the matte and slag.

5. The method of recovering non-ferrous metals from slags which comprises injecting a reducing agent into a molten bath containing a layer of slag in contact with a body of matte to agitate the bath and effect a separation of matte contained in the slag.

6. The method of increasing the fluidity of slag containing magnetite which comprises subjecting molten slag to the action of reducing agent in the presence of a solvent for metallic iron.

7. The method of increasing the fluidity of slag containing magnetite which comprises injecting a reducing agent into a molten slag bath in the presence of a solvent for metallic iron.

8. The improvement in copper metallurgy which comprises injecting a reducing agent into molten slag obtained in the smelting of copper ore in the presence of a solvent for metallic iron to reduce one or more iron compounds contained therein.

9. The improvement in copper metallurgy which comprises subjecting a molten bath comprising slag and matte obtained by smelting copper ore to the action of a reducing agent to reduce magnetite contained in the slag.

10. The improvement in copper metallurgy which comprises subjecting a molten bath comprising matte and basic slag obtained by smelting copper ore to the action of a reducing agent to reduce magnetite contained therein.

11. The improvement in copper metallurgy which comprises subjecting molten acid slag obtained in the treatment of copper ore to the action of a reducing agent to reduce one or more uncombined iron compounds and effect the precipitation of matte contained therein, and separating the matte and slag.

12. The improvement in copper metallurgy which comprises subjecting molten basic slag obtained in the treatment of copper ore to the action of a reducing agent to reduce one or more uncombined iron compounds and effect the precipitation of matte contained therein, and separating the matte and slag.

13. The improvement in copper metallurgy which comprises injecting a reducing agent into a bath of slag and matte in a basic lined copper converter to reduce one or more iron compounds and effect the separation of matte contained in the slag.

MORRIS G. FOWLER.
OLIVER C. RALSTON.
CHARLES R. KUZELL.